(12) United States Patent
Kosako (10) Patent No.: US 10,753,854 B2
(45) Date of Patent: Aug. 25, 2020

(54) HIGH SELECTIVITY CORROSION SENSOR SYSTEM

(71) Applicant: Yazaki Corporation, Tokyo (JP)

(72) Inventor: Terukazu Kosako, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/445,549

(22) Filed: Jun. 19, 2019

(65) Prior Publication Data

US 2019/0302002 A1 Oct. 3, 2019

Related U.S. Application Data

(63) Continuation of application No. PCT/JP2017/047220, filed on Dec. 28, 2017.

(30) Foreign Application Priority Data

Jan. 16, 2017 (JP) ................................ 2017-004963

(51) Int. Cl.
*G01N 17/04* (2006.01)
*G01N 21/552* (2014.01)
*G01N 21/41* (2006.01)

(52) U.S. Cl.
CPC ............. *G01N 17/04* (2013.01); *G01N 21/41* (2013.01); *G01N 21/553* (2013.01)

(58) Field of Classification Search
CPC ...... G01N 17/04; G01N 21/41; G01N 21/553; G01N 21/554
See application file for complete search history.

(56) References Cited

U.S. PATENT DOCUMENTS 5,327,225 A * 7/1994 Bender ................ G01N 21/553
250/307
5,570,139 A * 10/1996 Wang ...................... G02F 1/195
345/84

(Continued)

FOREIGN PATENT DOCUMENTS

JP 11-326019 A 11/1999
JP 2001-201451 A 7/2001

(Continued)

OTHER PUBLICATIONS

F. Abdelmalek, "Surface plasmon resonance based on Bragg gratings to test the durability of Au—Al films", Materials Letters, Nov. 2002, pp. 213-218, vol. 57.

(Continued)

*Primary Examiner* — Kara E. Geisel
(74) *Attorney, Agent, or Firm* — Sughrue Mion, PLLC (57) ABSTRACT

The high selectivity corrosion sensor system includes: a sensor group including at least one selected from SPR sensors whose sensor surfaces have metallic thin films made of different materials, SPR sensors whose sensor surfaces have functional films made of different materials, and LSPR sensors including different metallic fine particles; a light projector projecting light toward the sensors; a detector detecting, as signal intensities, light beams being from the sensors and corresponding to the light beam intensities; a database in which information on corrosion of a subject metal is accumulated; and an analyzer analyzing a degree of corrosion of the subject metal by pattern recognition based on the signal intensities from the detector and the information in the database.

9 Claims, 7 Drawing Sheets

(56) References Cited

U.S. PATENT DOCUMENTS

| | | | | |
|---|---|---|---|---|
| 5,815,278 | A * | 9/1998 | Johnston | G01N 21/553 356/445 |
| 6,471,136 | B1 * | 10/2002 | Chatterjee | F25D 17/042 237/2 B |
| 9,823,192 | B1 * | 11/2017 | Chan | G01N 21/553 |
| 2002/0108911 | A1 | 8/2002 | Xiong et al. | |
| 2003/0076501 | A1 * | 4/2003 | Hofmann | G01N 21/553 356/445 |
| 2003/0128364 | A1 * | 7/2003 | Dickopf | G01N 21/553 356/445 |
| 2004/0155309 | A1 * | 8/2004 | Sorin | G01N 21/253 257/433 |
| 2006/0098843 | A1 * | 5/2006 | Chew | B61K 9/08 382/103 |
| 2006/0255292 | A1 * | 11/2006 | Ja | G01N 21/648 250/484.2 |
| 2009/0004670 | A1 * | 1/2009 | Zhang | G01N 33/582 435/7.1 |
| 2009/0103851 | A1 * | 4/2009 | Tsao | G01N 21/553 385/12 |
| 2011/0151107 | A1 * | 6/2011 | Tsao | C23C 16/44 427/10 |
| 2012/0105857 | A1 * | 5/2012 | Lee | B82Y 15/00 356/445 |
| 2012/0262718 | A1 * | 10/2012 | Yamada | G01N 21/554 356/436 |
| 2013/0120752 | A1 * | 5/2013 | Lee | G02B 6/02 356/445 |
| 2016/0223466 | A1 * | 8/2016 | Mano | G02B 6/1225 |

FOREIGN PATENT DOCUMENTS

| | | |
|---|---|---|
| JP | 2011-002423 A | 1/2011 |
| JP | 2016-142617 A | 8/2016 |
| WO | 2010/134470 A1 | 11/2010 |

OTHER PUBLICATIONS

Associate Professor Hiroki Akasaka, Transactions of the Japan Society of Mechanical Engineers, 2014, p. 182, vol. 117, No. 1144, Tokyo Institute of Technology English.
Mark W. Knight et al., "Aluminum for Plasmonics", ACS Nano, 2014, pp. 834-840, vol. 8, No. 1.
International Search Report of PCT/JP2017/047220 dated Mar. 13, 2018 [PCT/ISA/210].

* cited by examiner

INCIDENT ANGLE

HIGH SELECTIVITY CORROSION SENSOR SYSTEM

CROSS REFERENCE TO RELATED APPLICATION

This application is a Continuation of PCT Application No. PCT/JP2017/047220, filed on Dec. 28, 2017, and claims the priority of Japanese Patent Application No. 2017-004963, filed on Jan. 16, 2017, the content of all of which is incorporated herein by reference.

BACKGROUND

1. Technical Field

The present invention relates to a high selectivity corrosion sensor system. Specifically, the present invention relates to a high selectivity corrosion sensor system capable of analyzing and measuring various corrosive environments for metal with use of a surface plasmon resonance sensor.

2. Related Art

There have been proposed various sensors capable of analyzing and measuring an environment causing metal corrosion. For example, salt in seawater flying from the ocean has a great effect on metal corrosion. As a sensor for measuring the amount of the sea salt, a quartz oscillator sensor has been proposed (for example, see JP 11-326019 A). The quartz oscillator sensor performs the measurement by making use of a nature of a quartz oscillator that the resonance frequency of the quartz oscillator changes when sea salt flying from the ocean adheres to the quartz oscillator.

However, the quartz oscillator sensor is targeted only at the sea salt flying thereto, and thus cannot perform measurement on other factors (e.g., a sulfur oxide (SOx), a wet time) that influences on the metal corrosion. Furthermore, the quartz oscillator sensor is not suitable for the measurement of corrosion in areas being away from the seaside and having a relatively low flying sea salt concentration, such as urban areas and farming areas. Moreover, in principle, even when a matter that is not a corrosive substance adheres to the quartz oscillator sensor, a detection signal from the quartz oscillator sensor will change. Therefore, it is difficult for the quartz oscillator sensor to identify a specific corrosive substance.

In addition, metal corrosion under an atmospheric environment progresses mostly while the surface of the metal is wet due to, e.g., rainfall and/or water condensation. Meanwhile, conventional electrochemical measurement techniques are designed for the evaluation of metal corrosion under a submerged environment, and thus are not suitable for evaluating corrosion under an atmospheric environment. In view of this, as a sensor for evaluating corrosion under an atmospheric environment, a galvanic corrosion sensor (ACM sensor) has been proposed, for example (e.g., see JP 2001-201451 A). With this sensor, it is possible to perform measurement of corrosive environments such as an amount of adhering water salt, a rainfall time, a water condensation time, and a dry time.

However, although the galvanic sensor is capable of measuring the various corrosive environments as described above, it is difficult for the galvanic sensor to predict how the corrosive environment will transition thereafter. In addition, in order to detect a signal indicating that the corrosion has progressed, the sensor surface of the galvanic sensor needs to have a certain amount of electrolyte on its surface and to be wet adequately. Therefore, the galvanic sensor can hardly perform the measurement in a dry state. Moreover, it takes long time (e.g. months) to perform the measurement, and therefore it is difficult to perform quick evaluation.

Meanwhile, a surface plasmon resonance sensor can measure, on a nano-scale of several nm to several some hundreds of nm, a change in a medium surrounding the sensor surface. Furthermore, the surface plasmon resonance sensor can evaluate corrosion in a nondestructive and noninvasive manner, advantageously. For example, JP 2011-2423 A suggests detecting, with the surface plasmon resonance sensor, metal corrosion caused by bacteria in an anaerobic environment.

SUMMARY

While having the above-described advantages, the conventional surface plasmon resonance sensor has some problems. For example, with the sensor whose sensor portion is made of only a single metal, it is impossible to determine whether a shift of the resonant peak is caused by metal corrosion or an adhering matter. Namely, it is impossible to identify what exists on the sensor surface. In order to solve this problem, it is attempted that a functional film to which a specific substance selectively adheres and/or is fixed is provided to the sensor surface of a biosensor, for example. However, such a biosensor would detect a substance that is not a target substance even by only existence of the substance, not by adhesion on the sensor surface.

In addition, the surface plasmoh resonance sensor also detects a change occurred in its surrounding medium. Therefore, only with a single sensor, it is impossible to discriminate between such a signal and a sensor signal derived from metal corrosion.

Furthermore, the surface plasmon resonance sensor described in JP 2011-2423 A employs a vapor-deposited gold or silver film as a metallic material of the sensor. However, considering the fact that gold and silver are corrosion-resistant metals, it is assumed that a shift of the resonant peak measured is caused by a matter adhering on the sensor surface, rather than by corrosion of the sensor surface. Namely, the surface plasmon resonance sensor described in JP 2011-2423 A is not suitable as a sensor for detecting metal corrosion.

Hence, the single surface plasmon resonance sensor is a low selectivity sensor capable of evaluating only a single corrosive environment, and therefore cannot be used as a high selectivity sensor for estimating a wide variety of metal corrosion environments.

The present invention is made in view of the problems of the conventional techniques described above. An object of the present invention is to provide a high selectivity corrosion sensor system capable of estimating a wide variety of metal corrosion environments with a high sensitivity and a high selectivity in a short period.

A high selectivity corrosion sensor system according to a first aspect of the present invention includes:

a sensor group including at least two sensors selected from surface plasmon resonance sensors and localized surface plasmon resonance sensors, the at least two sensors having different corrosion resistances and different corrosion tendencies with respect to a corrosive environment;

a light projector configured to project light toward the sensors in the sensor group;

a detector configured to detect, as signal intensities, light beams from the sensors in the sensor group, the signal intensities corresponding to intensities of the light beams;

a database in which information on corrosion of a subject metal is accumulated; and an analyzer configured to analyze a degree of the corrosion of the subject metal by performing pattern recognition based on the signal intensities detected by the detector and the information accumulated in the database.

A high selectivity corrosion sensor system according to a second aspect of the present invention is related to the high selectivity corrosion sensor system that constitutes the first aspect, and may be configured such that the sensor group includes at least one selected from the group consisting of (1) a surface plasmon resonance sensor whose sensor surface has a metallic thin film, (2) surface plasmon resonance sensors whose sensor surfaces have metallic thin films made of different materials, (3) a surface plasmon resonance sensor whose sensor surface has a functional film, (4) surface plasmon resonance sensors whose sensor surfaces have functional films made of different materials, (5) a localized surface plasmon resonance sensor whose sensor portion has metallic fine particles, (6) localized surface plasmon resonance sensors whose sensor portions have different metallic fine particles, (7) a localized surface plasmon resonance sensor whose sensor portion has metallic fine particles having surfaces provided with a functional film, and (8) localized surface plasmon resonance sensors whose sensor portions have metallic fine particles having surfaces provided with functional films made of different materials, the sensor group being not a sensor group including only one selected from the group consisting of (1), (3), (5), and (7).

A high selectivity corrosion sensor system according to a third aspect of the present invention is related to the high selectivity corrosion sensor system that constitutes the second aspect, and may be configured such that the surface plasmon resonance sensor of (1) or (2) includes an optical fiber having an end surface on which the metallic thin film is formed or an optical fiber partially having a region in which a clad of the optical fiber is removed and a core of the optical fiber is exposed and on which the metallic thin film is formed.

A high selectivity corrosion sensor system according to a fourth aspect of the present invention is related to the high selectivity corrosion sensor system that constitutes the second aspect, and may be configured such that the localized surface plasmon resonance sensor of (5) or (6) includes a substrate on which a large number of metallic fine particles are arranged.

A high selectivity corrosion sensor system according to a fifth aspect of the present invention is related to the high selectivity corrosion sensor system that constitutes the fourth aspect, and may be configured such that each of the large number of metallic fine particles is a dielectric sphere covered with a metallic thin film.

A high selectivity corrosion sensor system according to a sixth aspect of the present invention is related to the high selectivity corrosion sensor system that constitutes the second aspect, and may be configured such that the localized surface plasmon resonance sensor of (5) or (6) includes an optical fiber having an end surface on which a large number of metallic fine particles are arranged or an optical fiber partially having a region in which a clad of the optical fiber is removed and a core of the optical fiber is exposed and on which a large number of metallic fine particles are arranged.

A high selectivity corrosion sensor system according to a seventh aspect of the present invention is related to the high selectivity corrosion sensor system that constitutes the sixth aspect, and may be configured such that each of the large number of metallic fine particles is a dielectric sphere covered with a metallic thin film.

A high selectivity corrosion sensor system according to an eighth aspect of the present invention is related to the high selectivity corrosion sensor system that constitutes any one of the first to seventh aspects, and may be configured such that the sensor group includes, as a reference sensor, a surface plasmon resonance sensor whose sensor surface has a metallic thin film that is a gold film or a surface plasmon resonance sensor whose sensor surface has a metallic thin film on which a protection film is formed.

According to the present invention, it is possible to provide a high selectivity corrosion sensor system capable of estimating a wide variety of metal corrosion environments with a high sensitivity and a high selectivity in a short period.

DETAILED DESCRIPTION

With reference to the drawings, the following will describe details of a high selectivity corrosion sensor system according to embodiments of the present invention. Note that the proportions of the sizes in the drawings may be exaggerated for convenience of explanation and may be different from actual proportions occasionally.

A high selectivity corrosion sensor system according to the present embodiment includes: a sensor group including at least two sensors selected from surface plasmon resonance sensors (hereinafter, sometimes referred to as "SPR sensors") and localized surface plasmon resonance sensors (hereinafter, sometimes referred to as "LSPR sensors"), the at least two sensors having different corrosion resistances and different corrosion tendencies with respect to a corrosive environment; a light projector configured to project light toward the sensors in the sensor group; a detector configured to detect, as signal intensities, light beams from the sensors in the sensor group, the signal intensities corresponding to intensities of the light beams; and a database in which information on corrosion of a subject metal (i.e., a metal to be measured) is accumulated. The high selectivity corrosion sensor system predicts a corrosive environment by performing pattern recognition on detection signals detected by the sensor group.

Namely, the high selectivity corrosion sensor system according to the present embodiment predicts corrosive environments of a great number of metals by performing pattern recognition on signal intensity ratios obtained by at least two sensors selected from a small number of SPR sensors and LSPR sensors having different corrosion resistances and different corrosion tendencies with respect to a corrosive environment (hereinafter, such sensors will be simply referred to as "SPR sensors" collectively). With this configuration, it is possible to evaluate a wide variety of corrosive environments with a high sensitivity and a high selectivity in a short period, which could not have been achieved with a single SPR sensor that provides a low selectivity. Note that the expression "different corrosion resistances (with respect to a corrosive environment)" means different durability against corrosion, and the expression "different corrosion tendencies (with respect to a corrosive environment)" means different rates and/or different processes of progression of corrosion. Constituent elements of the high selectivity corrosion sensor system according to the present embodiment will be subsequently described.

[Sensor Group]

The sensor group includes at least two SPR sensors having different corrosion resistances and corrosion tendencies with respect to a corrosive environment. In the present embodiment, the at least two SPR sensors respectively have sensor surfaces that are metallic thin films and/or functional films made of different materials in order to achieve different corrosion resistances and different corrosion tendencies with respect to a corrosive environment. Namely, the sensor group includes at least one selected from the group consisting of (1) an SPR sensor whose sensor surface has a metallic thin film, (2) SPR sensors whose sensor surfaces have metallic thin films made of different materials, (3) an SPR sensor whose sensor surface has a functional film, (4) SPR sensors whose sensor surfaces have functional films made of different materials, (5) an LSPR sensor whose sensor portion has metallic fine particles, (6) LSPR sensors whose sensor portions have different metallic fine particles, (7) an LSPR sensor whose sensor portion has metallic fine particles having surfaces provided with a functional film, and (8) LSPR sensors whose sensor portions have metallic fine particles having surfaces provided with functional films made of different materials. Note that the sensor group is not a sensor group including only one selected from the group consisting of (1), (3), (5), and (7).

Figure 1:
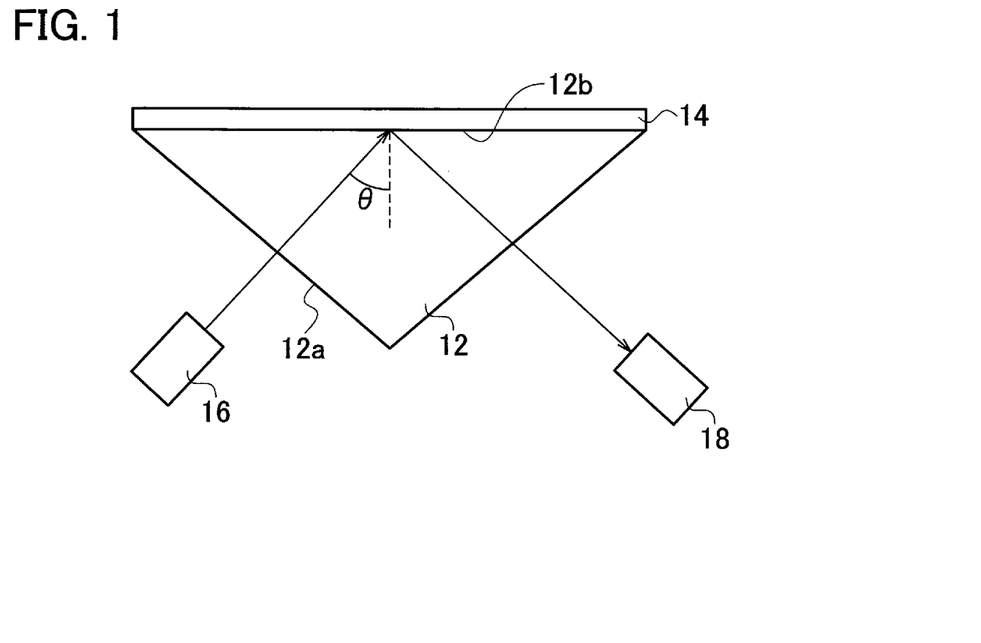
FIG. 1 is a view schematically illustrating an overview of an SPR sensor.

The sensing principle of the SPR sensor is described here. Typically, the SPR sensor includes a prism 12, a metallic thin film 14 formed on one surface of the prism 12, a light projector 16, and a detector 18, as illustrated in FIG. 1. The light projector 16 emits light so that the light enters the prism 12 through surface (12a) of the prism 12. The light-emitting position of the light projector 16 is controlled so that light enters an interface between the prism 12 and the metallic thin film 14 at various incident angles. The detector 18 detects, at each of the various incident angles, the intensity of light that has undergone total reflection at the interface between the prism 12 and the metallic thin film 14.

According to the above configuration, when the light projector 16 emits light so that the light enters the interface between the prism 12 and the metallic thin film 14 at an incident angle θ that is equal to or greater than a total reflection angle, perpendicular components of the incident light with respect to the interface form light penetrating into the inside of the metallic thin film 14. Such light is called evanescent light. The evanescent light propagates along the refractive-index interface and is attenuated exponentially as being apart from the interface. A wavevector; $k_{ev}$ of the evanescent light is equal to a wavevector; $k_x$ of a component of the incident light in the direction of the interface. Hence, $k_{ev}$ is given by the following equation. Thus, with respect to each of the various incident angles θ, the wavenumber of the evanescent light has a value varying according to sine.

$$k_{ev} = k_x = \frac{n\omega}{c}\sin\theta$$

[n; denotes a refractive index in the prism side, ω; denotes an angular frequency of light, and c; denotes the speed of light in vacuum]

Meanwhile, by the evanescent light generated at the interface between the prism 12 and the metallic thin film 14, a surface plasmon wave is generated on the surface of the metal (metal/dielectric interface). The surface plasmon wave is collective oscillations of free electrons in the metal, which are localized at the surface of the metal.

Figure 2:
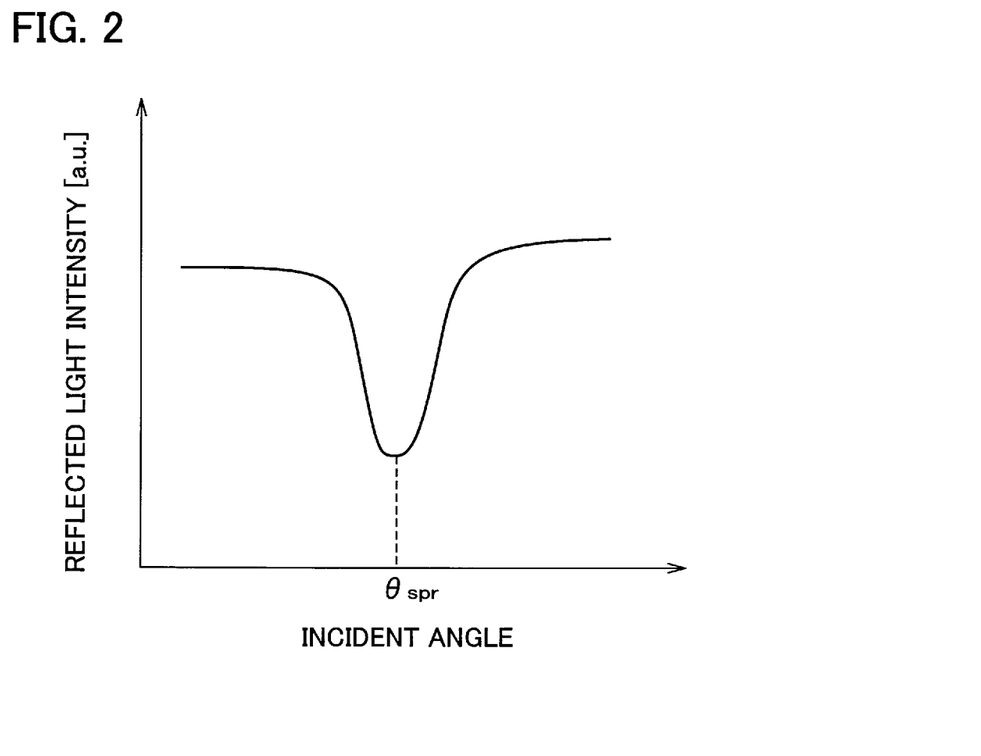
FIG. 2 is a graph illustrating a relation of an intensity of reflected light with respect to an incident angle of light coming from a light source in the SPR sensor.

When light is caused to enter the interface at a certain incident angle at which the wavenumber of the surface plasmon wave and the wavenumber of the evanescent light are equal to each other, a phenomenon that is called surface plasmon resonance occurs. At that time, the energy of the incident light is used to excite the surface plasmon wave, and thus the intensity of the totally reflected light is reduced significantly, as illustrated in FIG. 2.

The surface plasmon wave is very sensitive to the state of the surface of the metallic thin film. Therefore, when a substance adheres onto the metallic thin film, the incident angle of the light at which the intensity of the totally reflected light is reduced is shifted. The incident angle $\theta_{spr}$ of the light at which the surface plasmon resonance occurs can be expressed by the equation below, where $n_p$ denotes the refractive index of the medium on the light incident side, $\varepsilon_m$ denotes the dielectric constant of the metallic thin film, and $\varepsilon_{ss}$ denotes the dielectric constant of the substance adhering on the surface of the metallic thin film.

$$\sin\theta_{spr} = \frac{1}{n_p}\sqrt{\frac{\varepsilon_m \cdot \varepsilon_s}{\varepsilon_m + \varepsilon_s}}$$

The refractive index $n_p$ of the medium on the light incident side and the dielectric constant $\varepsilon_m$ of the metallic thin film are constant. Therefore, by a change in the dielectric constant $\varepsilon_s$ of the substance on the surface of the metallic thin film, the incident angle $\theta_{spr}$ of the light at which the surface plasmon resonance occurs changes. Namely, in order to cause the surface plasmon resonance, it is necessary to change the incident angle of the light according to the type of the substance adhering on the surface of the metallic thin film. Conversely, by figuring out the incident angle of the light at which the surface plasmon resonance occurs, it is possible to know the dielectric constant of the substance adhering on the surface of the metallic thin film. Thus, by observing a shift in the incident angle of the light at which the reduction in the intensity of the totally reflected light is observed, it is possible to know the dielectric constant $\varepsilon_s$ of the substance adhering on the metallic thin film. Based on the dielectric constant $\varepsilon_s$, it is possible to identify the substance.

Figure 3:
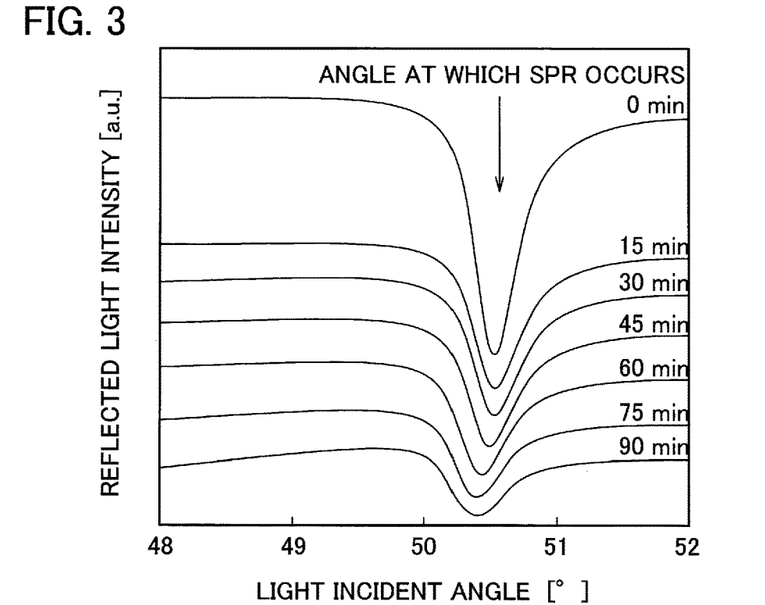
FIG. 3 is a graph showing that an angle at which SPR occurs is shifted along with progression of corrosion of an amorphous carbon film.

The following describes one example cited from "Transactions of the Japan Society of Mechanical Engineers, Vol. 117, No. 1144, p. 182 (2014), Hiroki AKASAKA". FIG. 3 illustrates changes over time in corrosion of an amorphous carbon film immersed in a 0.3 M aqueous nitric acid solution, measured with an SPR sensor. FIG. 3 illustrates a graph including curves indicating the results obtained with elapsed times of 0 minute, 15 minutes, 30 minutes, 45 minutes, 60 minutes, 75 minutes, and 90 minutes in this order from the top. In each of the curves in the graph, the incident angle at which the intensity of reflected light is significantly reduced is the incident angle $\theta_{spr}$ of the light at which the surface plasmon resonance occurs. The graph also shows that the incident angle $\theta_{spr}$ is shifted with lapse of time. Namely, the graph shows that, with lapse of time, the corrosion of the surface of the amorphous carbon film, i.e., the surface of the metallic thin film progresses, and the incident angle $\theta_{spr}$ is shifted. Thus, based on the fact that the incident angle $\theta_{spr}$ is shifted (i.e., the dig position is shifted) according to the state of the corrosion, it is possible to predict the corrosive state from the incident angle $\theta_{spr}$.

Next, the sensing principle with the LSPR sensor will be described. The surface plasmon resonance described above occurs in a region of approximately a wavelength of light from the surface of the metallic thin film. Meanwhile, the localized surface plasmon resonance occurs, on the surface of a quite small, nano-scale metallic fine particle of a size equal to or smaller than the wavelength of light, locally in a range substantially equal to the diameter of the particle. The LSPR occurs in a specific wavelength region that varies depending on the material, shape, size, and/or surrounding medium of the metallic nanoparticle.

Figure 4:
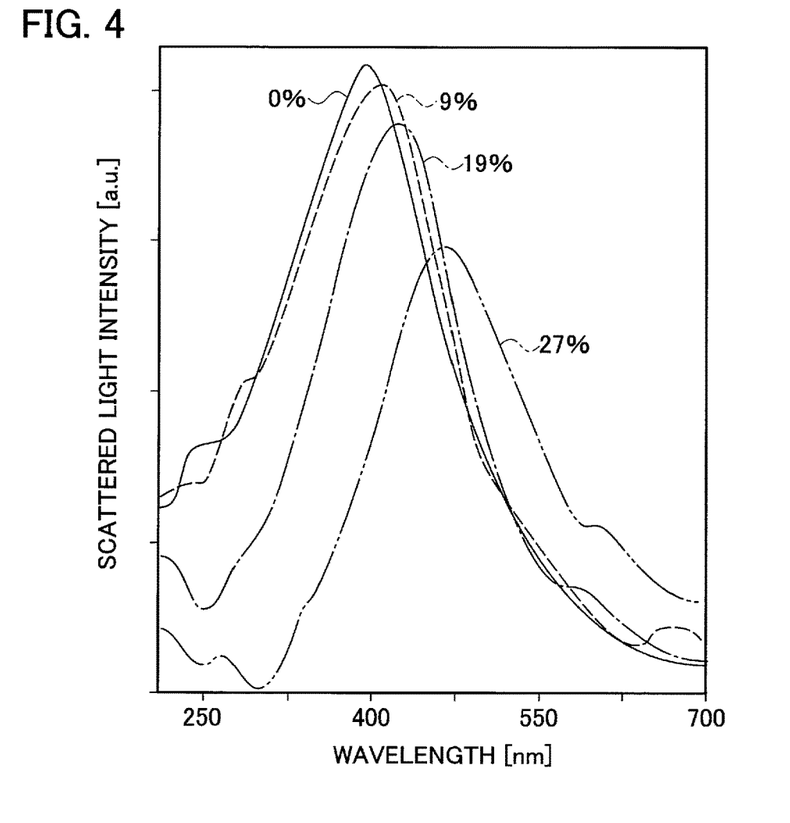
FIG. 4 is a view illustrating a spectrum of scattered light generated at aluminum nanoparticles.

The following describes one example cited from "Mark W. Knight, et al., ACS Nano, 2014, 8(1), pp. 834-840." FIG. 4 is a graph illustrating the results of detection of the intensities of the scattered light rays generated when light of a wavelength of 200 to 700 nm is emitted to aluminum nanoparticles (having a columnar shape of 50 nm in diameter and 35 nm in height) having different oxidized states. FIG. 4 illustrates a graph including curves indicating the results obtained with oxidized states of 0%, 9%, 19%, and 27% in this order from the top. FIG. 4 shows that, as the oxidation progressed, the intensity peak position of the scattered light caused by the localized surface plasmon resonance is shifted. Namely, progression of metal corrosion can be detected with the LSPR sensor on a nano-scale.

Next, the following will describe the SPR sensors in the sensor group according to the present embodiment.

(SPR Sensor Whose Sensor Surface has Metallic Thin Film)

The SPR sensor is (1) a single SPR sensor whose sensor surface has a metallic thin film or (2) SPR sensors whose sensor surfaces have metallic thin films made of different materials. In a case where the SPR sensor is the single SPR sensor, the single SPR sensor is combined with another SPR or LSPR sensor to constitute the sensor group. The SPR sensors whose sensor surfaces have metallic thin films made of different materials are different from each other in the rate and/or process of progression of corrosion of the metallic thin films with respect to a corrosive environment, due to the difference in the material of the metallic thin film. Therefore, even under the same corrosive environment, the amount of shifting of the SPR peak and the degree of change in the peak intensity vary depending on the metallic material.

Figure 5:
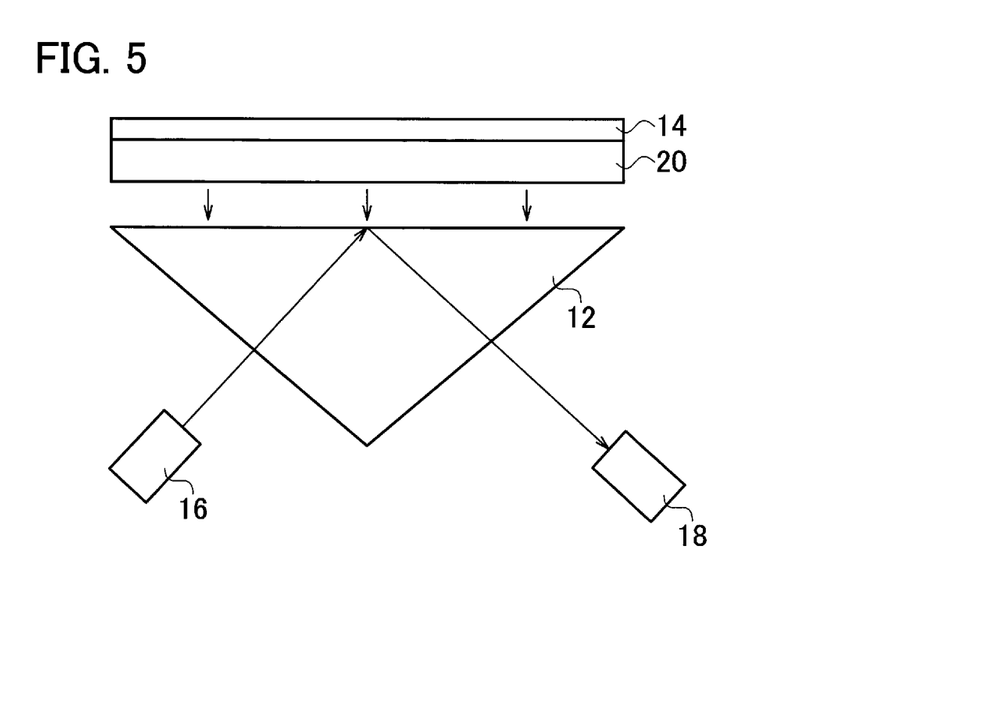
FIG. 5 is a view schematically illustrating another SPR sensor different from the SPR sensor illustrated in FIG. 1.

One exemplary form of the SPR sensor whose sensor surface has a metallic thin film is the form illustrated in FIG. 1 described above. In this form, the metallic thin film 14 is directly formed on the prism 12. This form is disadvantageous in terms of cost, since not only the metallic thin film 14 but also the prism 12 needs to be replaced with a new one if the metallic thin film 14 becomes unusable due to corrosion. In addition, with this form, setting of the optical system is troublesome. In view of this, a form that is free from the above problems, as those illustrated in FIG. 5, is preferable. FIG. 5 uses identical reference numerals to denote identical components between FIGS. 1 and 5. In the form illustrated in FIG. 5, the metallic thin film 14 is not directly formed on the prism 12, but a transparent substrate 20 on which the metallic thin film 14 is formed closely adheres to a prism 12 via an immersion oil. With this form, even if the metallic thin film 14 becomes unusable, only the transparent substrate 20 on which the metallic thin film 14 is formed may be replaced with a new one, and the prism 12 does not need to be replaced with a new one. Thus, this form is advantageous in terms of cost. In addition, with this form, it is possible to keep the prism 12 set at a predetermined position semipermanently, and thus setting of the optical system is easy.

The metallic material of the metallic thin film only needs to be a metallic material that can cause the surface plasmon resonance. Examples of such a metallic material encompass Au, Ag, Cu, Al, and alloys containing any of these metals.

The thickness of the metallic thin film only needs to be a thickness that can cause the surface plasmon resonance. Such a thickness may be several nm to several hundreds of nm, for example.

Instead of the prism having the surface on which the metallic thin film is formed, the SPR sensor of (1) or (2) may include an optical fiber having an end surface on which a metallic thin film is formed or an optical fiber partially having a region in which a clad of the optical fiber is removed and a core of the optical fiber is exposed and on which a metallic thin film is formed. With such a configuration, it is easier to perform the sensing even in a narrow and deep portion, as compared to the configuration including the prism having the surface on which the metallic thin film is formed.

Figure 6:
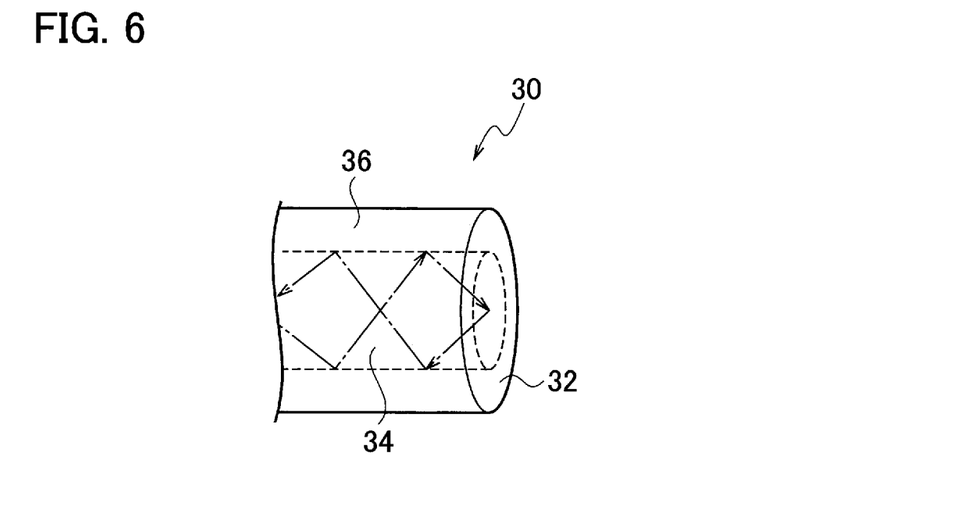
FIG. 6 is a view schematically illustrating an SPR sensor including an optical fiber whose end surface serves as a sensor surface.

FIG. 6 illustrates a configuration including an optical fiber 30 having an end surface on which a metallic thin film 32 is formed. The optical fiber 30 is configured such that a clad 36 surrounds the core 34. When light enters the optical fiber 30 through one end of the optical fiber 30, the light propagates the inside of the core 34. Then, if the light enters the metallic thin film 32, which is located at the end surface at another end of the optical fiber 30, at an angle that is equal to or greater than a total reflection angle, surface plasmon resonance occurs at the surface of the metallic thin film 32. Namely, the outer surface of the metallic thin film 32 serves as a sensor surface, similarly to the SPR sensors in FIGS. 1 and 5. Measurement of an optical spectrum with such an SPR sensor can be performed in the following manner. That is, light enters the optical fiber 30 through the one end of the optical fiber 30, and the light is reflected at the end surface (metallic thin film 32) at the other end of the optical fiber 30, so that the light comes back to the one end. The reflected light is then detected for the measurement.

Figure 7:
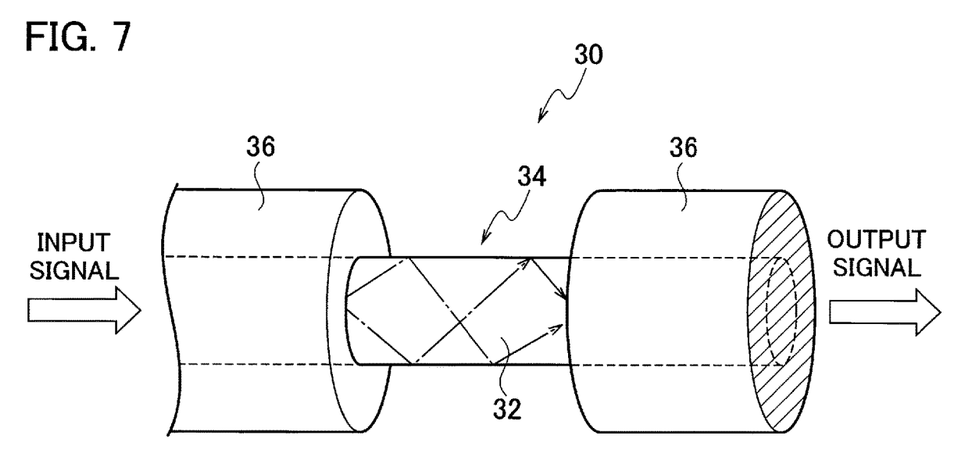
FIG. 7 is a view schematically illustrating an SPR sensor including an optical fiber partially having a region in which a clad provided on the surface of the optical fiber is removed to serve as a sensor surface.

Meanwhile, FIG. 7 illustrates an optical fiber 30 partially having a region in which a clad 36 is removed and a core 34 is exposed and a metallic thin film 32 is formed on the clad-removed region of the optical fiber 30. In this configuration, surface plasmon resonance occurs at a surface of the metallic thin film due to evanescent light generated at a surface of the core 34. Namely, the outer surface of the metallic thin film 32 serves as a sensor surface, similarly to the SPR sensors in FIGS. 1 and 5. Measurement of an optical spectrum with such an SPR sensor can be performed in the following manner. That is, light enters the optical fiber 30 through one end of the optical fiber 30, and the light is propagated through the clad-removed region, so that the light exits through another end of the optical fiber 30. The light is then detected for the measurement.

(SPR Sensor Whose Sensor Surface has Functional Film)

The SPR sensor is (3) a single SPR sensor whose sensor surface has a functional film or (4) SPR sensors whose sensor surfaces have functional films made of different materials. In a case where the SPR sensor is the single SPR sensor, the single SPR sensor is combined with another SPR or LSPR sensor to constitute the sensor group. The functional film is a film to which a specific substance selectively adheres and/or is fixed, and is formed on the metallic thin film as those described above.

The functional film is selected and used according to a specific substance so that the specific substance adheres and/or is fixed to the functional film. For example, in order to detect a virus, a functional film configured to adsorb a specific antibody is formed on the surface of the metallic thin film. For another example, in order to detect a specific gas such as hydrogen, carbon dioxide, a corrosive gas, or a volatile organic compound (VOC), a functional film configured to adsorb the specific gas is formed on the surface of the metallic thin film. For further another example, in order to detect an ion such as $Na^+$, $Li^+$, $K^+$, $NH_4^+$, $Al^{3+}$, or $Zn^{2+}$, a functional film (ionophore) configured to adsorb the specific ion is formed on the surface of the metallic thin film.

In a similar manner to the SPR sensor of (1) or (2), the above-described SPR sensor of (3) or (4) may have a metallic thin film and a functional film formed on an end surface of an optical fiber in this order. With such a configuration, it is easier to perform the sensing even in a narrow and deep portion, as compared to the configuration including the prism having the surface on which the metallic thin film is formed.

(Localized Surface Plasmon Resonance Sensor Whose Sensor Portion has Metallic Fine Particles)

The LSPR sensor is (5) a single LSPR sensor whose sensor portion has metallic fine particles or (6) LSPR sensors whose sensor portions have different metallic fine particles. In a case where the LSPR sensor is the single LSPR sensor, the single LSPR sensor is combined with another SPR or LSPR sensor to constitute the sensor group. The SPR sensors whose sensor portions have metallic fine particles made of different materials (metallic elements) are different from each other in the rate and/or process of progression of corrosion of the metallic thin films with respect to a corrosive environment, due to the difference in the material of the metallic fine particles on the sensor portion. Therefore, even under the same corrosive environment, the amount of shifting of the LSPR peak and the degree of change in the peak intensity vary depending on the metallic material.

Examples of the metallic fine particles encompass (1) spherical particles, (2) nanorod-shaped particles, e.g., particles having a slightly elongated spherical shape such as a rugby-ball shape or a cigar-shape, and (3) core-shell nanoparticles each made of a dielectric sphere whose surface is coated with a metallic thin film. Each of these metallic fine particles is typically several nm to several hundreds of nm in diameter.

The LSPR sensors described above are roughly classified into a type including a substrate and a type including an optical fiber. These types will be described below. In the LSPR sensor, the surfaces of the metallic fine particles serve as a sensing region.

Figure 8:
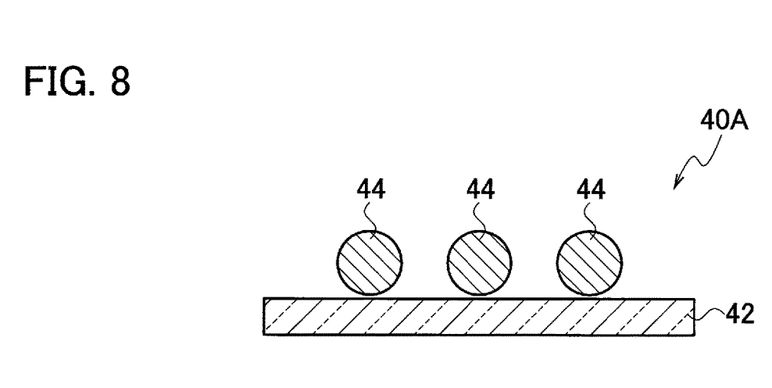
FIG. 8 is a view schematically illustrating an LSPR sensor including a substrate on which a large number of metallic fine particles are arranged.
Figure 9:
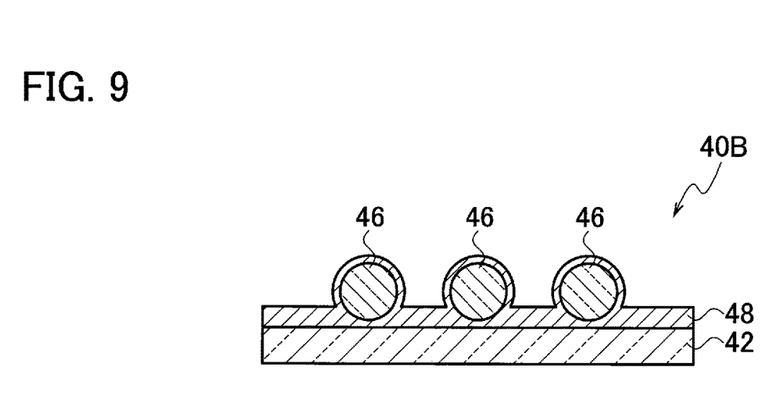
FIG. 9 is a view schematically illustrating an LSPR sensor including a substrate on which a large number of dielectric spheres covered with a metallic thin film are arranged.

FIGS. 8 and 9 schematically illustrate a sensor portion of an LSPR sensor of the type including the substrate. A sensor portion 40A illustrated in FIG. 8 is a substrate 42 on which a large number of metallic fine particles 44 are arranged. A sensor portion 40B illustrated in FIG. 9 is a substrate 42 on which a large number of dielectric spheres 46 covered with a metallic thin film 48 are arranged. Measurement of an optical spectrum with such an LSPR sensor can be performed by, e.g., a transmitted-light method that performs the measurement based on transmitted light of the sensor portion 40A or 40B, a reflected-light method that performs the measurement based on reflected light of the sensor portion 40A or 40B, or a scattered-light method that performs the measurement based on scattered light of the sensor portion 40A or 40B.

Figure 10:
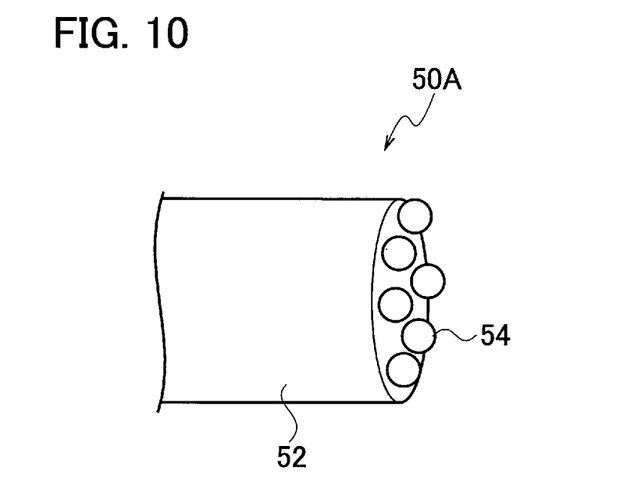
FIG. 10 is a view schematically illustrating an LSPR sensor including an optical fiber having an end surface on which a large number of metallic fine particles are arranged to serve as a sensor portion.
Figure 11:
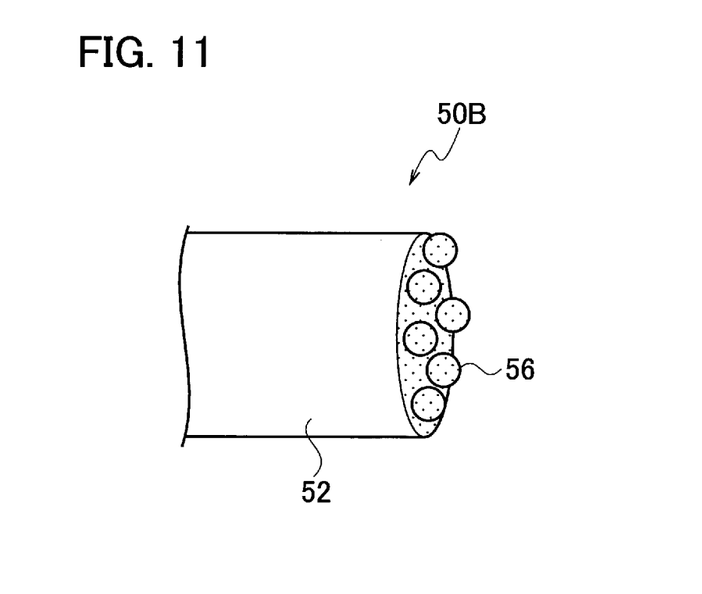
FIG. 11 is a view schematically illustrating an LSPR sensor including an optical fiber having an end surface on which a large number of dielectric spheres covered with a metallic thin film are arranged to serve as a sensor portion.

Meanwhile, FIGS. 10 and 11 schematically illustrate a sensor portion of an LSPR sensor of the type including the optical fiber. A sensor portion 50A illustrated in FIG. 10 is an end surface of an optical fiber 52 on which a large number of metallic fine particles 54 are arranged. A sensor portion 50B illustrated in FIG. 11 includes an optical fiber 52 having an end surface on which a large number of dielectric spheres covered with a metallic thin film 56 are arranged. Measurement of an optical spectrum with such an LSPR sensor can be performed in the following manner. That is, light enters the optical fiber 52 through one end of the optical fiber 52, and the light is reflected at the end surface at another end of the optical fiber 52, so that the light comes back to the one end. The reflected light is then detected for measurement.

Figure 12A:
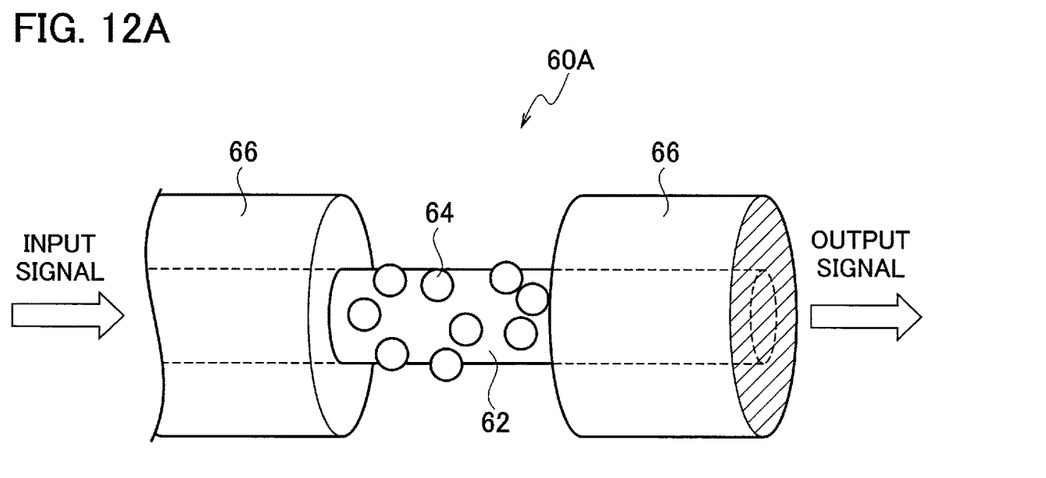
FIG. 12A is a view schematically illustrating an LSPR sensor that includes an optical fiber partially having a region in which a clad provided on the surface of the optical fiber is removed and a large number of metallic fine particles are arranged to serve as a sensor surface.
Figure 12B:
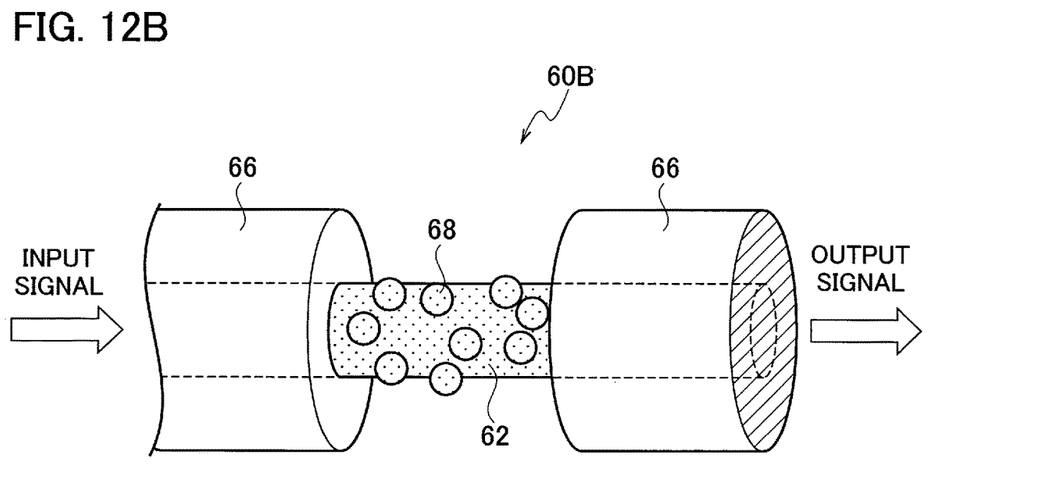
FIG. 12B is a view schematically illustrating an LSPR sensor that is similar to the LSPR sensor of FIG. 12A and has a region in which a clad is removed and a large number of dielectric spheres covered with a metallic thin film are arranged to serve as a sensor portion.

FIG. 12A illustrates an optical fiber 60A partially having a region in which a clad 66 is removed and a core 62 is exposed and a large number of metallic fine particles 64 are arranged on the clad-removed region of the optical fiber 60A, in a similar manner to FIG. 7. Meanwhile, an optical fiber 60B illustrated in FIG. 12B has a clad-removed region on which a large number of dielectric spheres covered with a metallic thin film 68 are arranged. Namely, the clad-removed regions of the optical fibers 60A and 60B each serve as a sensor portion. Measurement of an optical spectrum with such an LSPR sensor can be performed in the following manner. That is, light enters the optical fiber through one end of the optical fiber, and the light is propagated through the clad-removed region, so that the light exits through another end of the clad-removed region. The light is then detected for the measurement.

The sensor group according to the present embodiment can be a single one selected from the sensors of (2), (4), (6), and (8) or any combination of these sensors.

The number of sensors (SPR sensors, LSPR sensors), including a reference sensor, in the sensor group according to the present embodiment is preferably five or more in order to improve the accuracy in pattern recognition (described later). Seven sensors are enough to perform measurement with an adequate accuracy.

As the reference sensor, it is preferable to use an SPR sensor whose sensor surface has a metallic thin film that is a gold film. The gold film has a corrosion resistance, and thus the gold film would not allow progression of corrosion thereon. Therefore, the gold can serve as an indicator for comparison with another metal that does not have a corrosion resistance. Measurement performed with such a reference sensor will be described later.

[Light Projector]

The light projector includes a light source, a collimating lens, a polarizer, and a condensing lens, for example. The light source may be a semiconductor laser. Light emitted from the light source is converted by the collimating lens into a parallel luminous flux, which is then guided to the polarizer. The polarizer is configured to convert incident light into p-polarized light that may cause the surface plasmon. Thus, the light having been converted by the collimating lens into the parallel luminous flux is converted by the polarizer into the p-polarized light, which is directed toward the condensing lens. The light passes through the condensing lens, and is then guided to the SPR sensors. If necessary, a chopper may be additionally provided just behind the light source in order to increase a signal-to-noise ratio (S/N ratio).

In addition, an optical wavelength multiplex communication technique may be employed so that light beams having different wavelengths can be processed with a single optical fiber simultaneously. Generally, the wavelength of light at which the surface plasmon resonance occurs on the nanoparticle varies depending on the material of the nanoparticle. However, use of the optical wavelength multiplex communication technique enables evaluation on different nanoparticles with a single optical fiber simultaneously. In this case, a plurality of light sources for providing input light beams are necessary. In addition, a splitting optical element is used to collect the input light beams into the single optical fiber. Furthermore, the detection side includes a spectroscope for spectrally dispersing light outputted from the SPR sensors (i.e., separating the light into wavelength components) or a wavelength selecting filter.

[Detector]

The detector includes a light receiving element configured to receive light emitted from the sensors in the sensor group and perform photoelectric conversion on the light thus received. By the light receiving element, the received light is converted into an electric signal including information indicative of the strength of the received light.

[Database]

In the database, information on corrosion of a subject metal is accumulated. Specifically, combinations of the strength patterns of the signals detected by the sensors in the sensor group and the information on the corrosion of the subject metal are associated with each other, and are stored in a memory unit of an information processor, for example. Examples of the information on the corrosion of the subject metal encompass a corrosion cause, a corrosion progression level, a corrosion progression rate, a corrosion progression process (e.g., monotonic progression of corrosion or a tendency of saturation in corrosion). For example, in a case where a sensor group includes five SPR sensors having sensor surfaces made of different metallic thin films, the degrees of corrosion of a metal are classified according to the five strength patterns of these SPR sensors, and are converted into numeric values, for example. The numeric values thus obtained are stored.

It is preferable to prepare a large number of combinations of the above-described signal strength patterns and information on corrosion of the subject metal and to store these combinations as a database.

[Analyzer]

An analyzer analyzes the degree of corrosion of a subject metal by performing pattern recognition based on a plurality of signal intensities detected by the detector and the information accumulated in the database. The analysis is performed by execution of a pattern recognition program by, e.g., an information processor such as a personal computer. The analysis can be performed according to the theory such as Widrow-Hoff learning rule (Delta rule, orthogonal learning, least squares learning), Bayes decision rule, method of maximum likelihood, clustering, principal component analysis (≈Karhunen-Loève expansion; KL expansion), Fisher linear discriminant analysis (also called Fisher's method), parameter estimation, Markov model, nonparametric Bayesian model, or Mahalanobis-Taguchi (MT) system.

The following will describe estimation of the life of a metal. With use of a reaction rate equation, it is possible to model a reaction based on the result of an accelerated aging test. From this, it is possible to estimate the material life under various temperature environments. The following describes estimation of the life of a metal with reference to "Kenji ICHIKAWA, Ryuji TANAKA, Research Report of the Research Institute of Industrial Safety, RIIS-RR-87, 1987. "Kouatsu you gomu tebukuro no zetsuen rekka shindan—tennen gomu zetsuen zairyou no netsu rekka tokusei (Diagnosis of degradation of rubber insulating gloves for use in high voltage working—Thermal degradation of natural rubber insulating material)". First, the kinetic equation is given by equation (1) below:

$$\frac{d\alpha}{dt} = k(T)f(\alpha) = A\exp\left(-\frac{E}{RT}\right) \times (1-\alpha)^n \qquad (1)$$

In equation (1), $\alpha$ denotes a reacted fraction (e.g., a degree of change in the concentration of a reactant). The concentration of a reactant in a material that is in the course of a reaction is given by $f(\alpha)=(1-\alpha)^n$, assuming that $\alpha=1$ at the time of completion of the reaction. Meanwhile, n denotes a parameter designating the reaction order. Provided that the change in the concentration of the reactant causes a change in material physical property P such as an insulation property and/or a mechanical strength of the material, P is given by equation (2) below, as a function of the reacted fraction a:

$$P = g(\alpha) \quad (2)$$

Provided that the kinetic equation of the physical property P can also be expressed in the same form as equation (1) under the preconditions described above, the kinetic equation of the physical property P is given by equation (3) below:

$$\frac{dP}{dt} = k(T) \times h(P) \quad (3)$$

Here, Arrhenius' equation is substituted for k(T) in equation (3). Then, assuming that the physical property changes from $P_0$ to P when the reaction progresses from t=0 to t=t under a constant temperature, equation (3) is integrated. Consequently, equation (4) below is obtained.

$$\int_{P_0}^{P} \frac{1}{h(P)} dP = \left\{ A \exp\left(-\frac{E}{RT}\right) \right\} \int_0^t dt \quad (4)$$

Giving H(P) to the indefinite integral in the left side of equation (4) yields equation (5) below.

$$H(P) - H(P_0) = t \, A \exp\left(-\frac{E}{RT}\right) \quad (5)$$

Taking the log of both sides of equation (5) and rearranging equation (5) yields equation (6) below:

$$\ln t = \frac{E}{RT} + \ln\left\{\frac{H(P) - H(P_0)}{A}\right\} \quad (6)$$

Here, assuming that life $t_f$ expresses a period of time required for the physical property P to reduce (deteriorate) to $P_f$, and $T_f$ (constant temperature) expresses the temperature in the process of deterioration, the second term in the right side of equation (6) is always a constant (each of $H(P_f)$ and $H(P_0)$ is a fixed value). Hence, equation (7) below is obtained as a thermal deterioration life equation:

$$\ln t_f = \frac{E}{RT_f} + \text{constant} \quad (7)$$

Equation (7) shows that a linear relation is established between the inverse of temperature $T_f$ (constant temperature) at the time of evaluation and the log of lifetime $t_f$. The inclination of a straight line resulting from plotting of $\ln(t_f)$ and $(1/T_f)$ obtained under different constant temperature conditions is E/R, and the ordinate intercept corresponds to the constant in equation (7). Hence, from the linear plotting, it is possible to derive an activation energy E and a constant value. A value thus obtained is given to equation (7), whereby an equation expressing the relation between the temperature and the life is yielded. Namely, regarding a material to be undergone a chemical reaction, it is possible to estimate the life of the material at an arbitrary temperature.

Here, regarding the SPR sensor, which reacts to both of a change in the metallic thin film on the sensor surface and a change in the environment surrounding the sensor surface, it is possible to determine which of the changes has caused the SPR sensor to react, in the following manner. As a premise, in a case where the reference sensor is an SPR sensor whose sensor surface has a metallic thin film that is a gold film, no change will occur in a sensor signal caused by corrosion, since such a reference sensor has a sensor surface made of gold, which has a corrosion resistance. Meanwhile, in a case of a measurement sensor whose sensor surface has a metallic thin film that is not a gold film, the metallic thin film may be corroded. Thus, such a sensor may react to the corrosion of the metallic thin film and cause a change in its signal. In view of this, it is possible to determine whether a change in sensor signal is caused by a change in the metallic thin film on the sensor surface or by a change in the environment surrounding the sensor surface, based on comparison between the measurement sensor and the reference sensor in the following manner.

(1) If a signal from the reference sensor is not changed but a signal from the measurement sensor is changed, it is possible to determine that the corrosion of the metallic thin film on the sensor surface has progressed but the surrounding environment has not been changed.

(2) If both of a signal from the reference sensor and a signal from the measurement sensor are not changed, it is possible to determine that the corrosion of the metallic thin film on the sensor surface has not progressed and the surrounding environment has not been changed either.

(3) If both of a signal from the reference sensor and a signal from the measurement sensor are changed, it is possible to determine that at least the surrounding environment has been changed (it is unknown whether or not the corrosion of the metallic thin film on the sensor surface has progressed).

Figure 13:
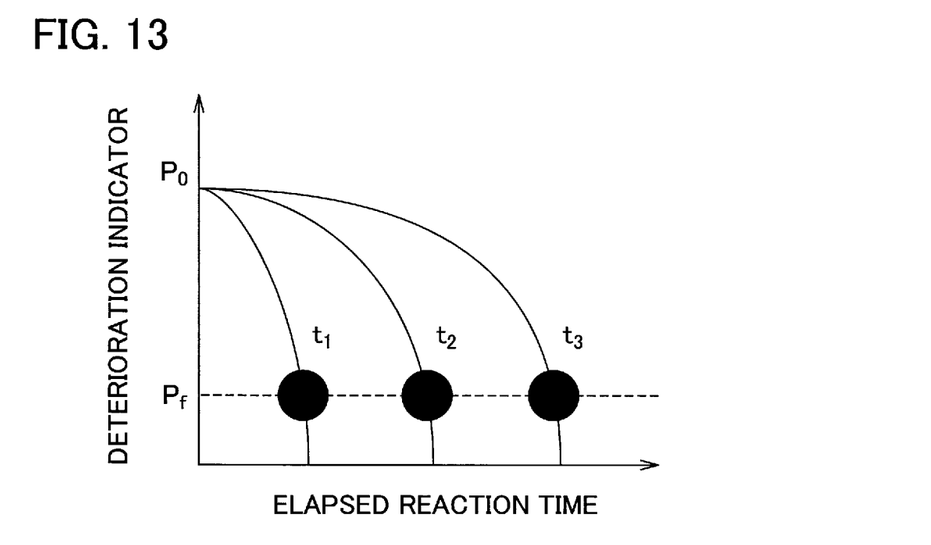
FIG. 13 is a graph illustrating changes in deterioration indicator of a metal with respect to an elapsed time.
Figure 14:
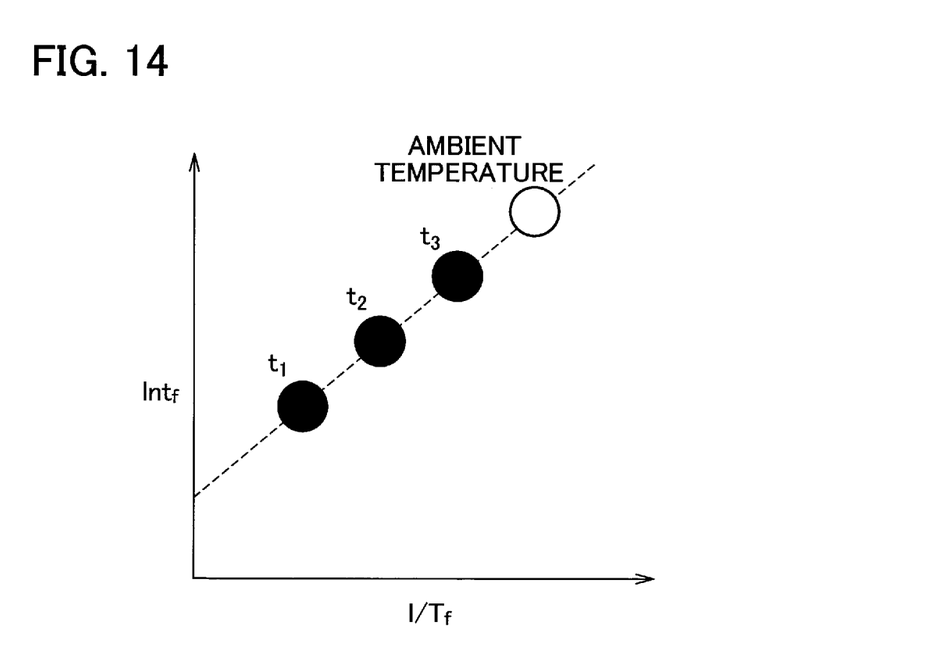
FIG. 14 is a view illustrating Arrhenius plotting used to estimate the life of a metal.

If the determination above is that the corrosion of the metallic thin film on the sensor surface of the measurement sensor has progressed, the sensor system measures changes over time of the corrosion deterioration. Namely, by using, as an indicator of the corrosion progress, a change in the peak position or the peak intensity of the optical spectrum caused by the surface plasmon resonance, the sensor system measures a period of time (life expiration time) elapsed until the deterioration indicator reaches a predetermined lower limit from an initial state, under different temperature conditions. Assume that the different temperature conditions are three or more temperature conditions that are equal to or higher than an ambient temperature. For example, under three temperature conditions of a temperature $T_f$ ($T_1$ to $T_3$ ($T_1 > T_2 > T_3 >$ ambient temperature)) being equal to or higher than an ambient temperature, the sensor system measures a period of time (life expiration time) $t_f$ ($t_1$ to $t_3$) elapsed until the deterioration indicator reaches a lower limit value ($P_f$) from an initial deterioration indicator ($P_0$). This is represented by the graph in FIG. 13. The temperatures $T_1$ to $T_3$ and the life expiration time $t_f$ ($t_1$ to $t_3$) obtained by the measurement are plotted in a coordinate system defined by the horizontal axis representing $1/T_f$ and the vertical axis representing $\ln t_f$. Consequently, as illustrated in FIG. 14, a primary straight line that is based on the equation ($\ln t_f = E/RT_f +$ constant) described above is obtained. From the inclination and the ordinate intercept of the straight line thus obtained, it is possible to calculate the life expiration time $t_f$ at the arbitrary temperature $T_f$. In FIG. 14, life expiration times at an ambient temperature are plotted as one example.

The above-described estimation of the life expiration time is of a sensor having a sensor surface on which only a metallic thin film is formed. Also with a sensor provided with a metallic thin film on which a corrosion protection film such as an amorphous carbon film, graphene, a painted film, and/or a resin is formed, it is possible to estimate a life expiration time. Namely, the SPR sensor whose metallic thin film has a surface on which the corrosion protection film is formed can also react to both of a change in the corrosion protection film on the sensor surface and a change in the environment surrounding the sensor surface. Thus, with use of the reference sensor and the measurement sensor, it is possible to determine which of the changes has caused the reaction in a similar manner to the sensor whose surface has the metallic thin film.

(1) If a signal from the reference sensor is not changed but a signal from the measurement sensor is changed, it is possible to determine that the corrosion of the corrosion protection film on the sensor surface has progressed but the surrounding environment has not been changed.

(2) If both of a signal from the reference sensor and a signal from the measurement sensor are not changed, it is possible to determine that the corrosion of the corrosion protection film on the sensor surface has not progressed and the surrounding environment has not been changed either.

(3) If both of a signal from the reference sensor and a signal from the measurement sensor are changed, it is possible to determine that at least the surrounding environment has been changed (it is unknown whether or not the corrosion of the corrosion protection film on the sensor surface has progressed).

If the determination above is that the corrosion of the corrosion protection film on the sensor surface of the measurement sensor has progressed, the sensor system measures changes over time of corrosion deterioration to estimate the life expiration time of the corrosion protection film based on the Arrhenius' equation, in a similar manner to the sensor system including the sensor whose surface has the metallic thin film.

With the high selectivity corrosion sensor system according to the present embodiment, it is possible to make a classification of a wide variety of atmospheric corrosive environments such as a volcanic gas environment, a seawater environment, a sulfur oxide environment, and/or a nitrogen oxide environment, and to predict the progression of corrosion of a metal based on the classification. In addition, it is possible to detect corrosion on a nano-scale. Thus, it is possible to estimate a corrosion rate with a high sensitivity and a high accuracy. Furthermore, with the sensor according to the present embodiment, it is possible to perform measurement on a subject metal in a nondestructive and contactless manner, and to exchange the sensor easily.

What is claimed is:

1. A high selectivity corrosion sensor system comprising:
    a sensor group including at least two sensors selected from surface plasmon resonance sensors and localized surface plasmon resonance sensors, the at least two sensors having different corrosion resistances and different corrosion tendencies with respect to a corrosive environment;
    a light projector configured to project light toward the sensors in the sensor group;
    a detector configured to detect, as signal intensities, light beams from the sensors in the sensor group, the signal intensities corresponding to intensities of the light beams;
    a database in which information on corrosion of a subject metal is accumulated; and
    an analyzer configured to analyze a degree of the corrosion of the subject metal by performing pattern recognition based on the signal intensities detected by the detector and the information accumulated in the database.

2. The high selectivity corrosion sensor system according to claim 1, wherein the sensor group includes at least one selected from the group consisting of (1) a surface plasmon resonance sensor whose sensor surface has a metallic thin film, (2) surface plasmon resonance sensors whose sensor surfaces have metallic thin films made of different materials, (3) a surface plasmon resonance sensor whose sensor surface has a functional film, (4) surface plasmon resonance sensors whose sensor surfaces have functional films made of different materials, (5) a localized surface plasmon resonance sensor whose sensor portion has metallic fine particles, (6) localized surface plasmon resonance sensors whose sensor portions have different metallic fine particles, (7) a localized surface plasmon resonance sensor whose sensor portion has metallic fine particles having surfaces provided with a functional film, and (8) localized surface plasmon resonance sensors whose sensor portions have metallic fine particles having surfaces provided with functional films made of different materials, the sensor group being not a sensor group including only one selected from the group consisting of (1), (3), (5), and (7).

3. The high selectivity corrosion sensor system according to claim 2, wherein the sensor group includes at least one from among the surface plasmon resonance sensor of (1) or (2) as at least one first sensor of the at least two sensors, each of the at least one first sensor includes an optical fiber having an end surface on which the metallic thin film is formed or an optical fiber partially having a region in which a clad of the optical fiber is removed and a core of the optical fiber is exposed and on which the metallic thin film is formed.

4. The high selectivity corrosion sensor system according to claim 2, wherein the sensor group includes at least one from among the localized surface plasmon resonance sensor of (5) or (6) as at least one first sensor of the at least two sensors, each of the at least one first sensor includes a substrate on which a large number of metallic fine particles are arranged.

5. The high selectivity corrosion sensor system according to claim 4, wherein each of the large number of metallic fine particles is a dielectric sphere covered with a metallic thin film.

6. The high selectivity corrosion sensor system according to claim 2, wherein the sensor group includes at least one from among the localized surface plasmon resonance sensor of (5) or (6) as at least one first sensor of the at least two sensors, each of the at least one first sensor includes an optical fiber having an end surface on which a large number of metallic fine particles are arranged or an optical fiber partially having a region in which a clad of the optical fiber is removed and a core of the optical fiber is exposed and on which a large number of metallic fine particles are arranged.

7. The high selectivity corrosion sensor system according to claim 6, wherein each of the large number of metallic fine particles is a dielectric sphere covered with a metallic thin film.

8. The high selectivity corrosion sensor system according to claim 1, wherein the sensor group includes, as a reference sensor, a surface plasmon resonance sensor whose sensor surface has a metallic thin film that is a gold film or a surface plasmon resonance sensor whose sensor surface has a metallic thin film on which a protection film is formed.

9. The high selectivity corrosion sensor system according to claim 8, wherein the analyzer is further configured to determine whether a signal intensity, detected by the detector, that corresponds to the light beam from the reference sensor is changed, and a signal intensity, detected by the detector, that corresponds to the light beam from another sensor of the sensor group is changed, and the analyzer is further configured to determine which from among progression of corrosion of a metallic portion of the another sensor of the sensor group and change in surrounding environment occurs based on determining that only one from among the signal intensity, that corresponds to the light beam from the reference sensor, and the signal intensity, that corresponds to the light beam from the another sensor of the sensor group, is changed.

\* \* \* \* \*